C. EKVALL.
MILK STRAINER.
APPLICATION FILED APR. 16, 1913.

1,080,545.

Patented Dec. 9, 1913.

WITNESSES
Howard H. Costello
H.B. Vrooman

INVENTOR
Conrad Ekvall
By E.E. Vrooman, his Attorney.

UNITED STATES PATENT OFFICE.

CONRAD EKVALL, OF ELGIN, ILLINOIS.

MILK-STRAINER.

1,080,545.  Specification of Letters Patent.  Patented Dec. 9, 1913.

Application filed April 16, 1913. Serial No. 761,564.

*To all whom it may concern:*

Be it known that I, CONRAD EKVALL, a citizen of the United States, residing at Elgin, in the county of Kane and State of Illinois, have invented certain new and useful Improvements in Milk-Strainers, of which the following is a specification, reference being had therein to the accompanying drawing.

This invention relates to a strainer and has special reference to a milk strainer which is provided with means for preventing the milk from falling directly upon the strainer member.

Another object of this invention is the production of a plurality of straining portions which are adapted to prevent the larger portions or particles of dirt from falling upon the strainer member.

With these and other objects in view, this invention consists of certain novel combinations, constructions and arrangements of parts as will be hereinafter fully described and claimed.

Figure 1:
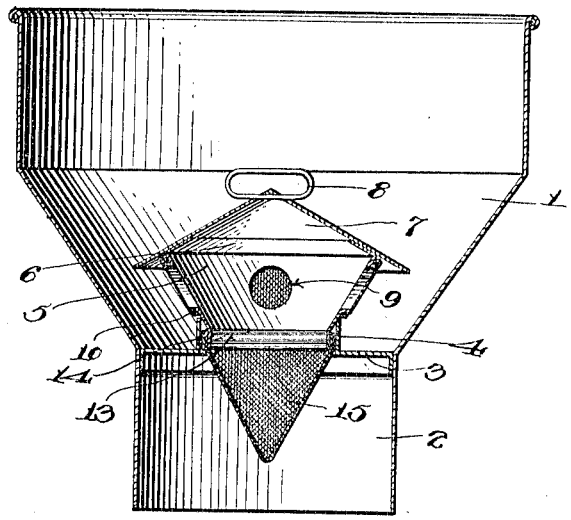
Figure 2:
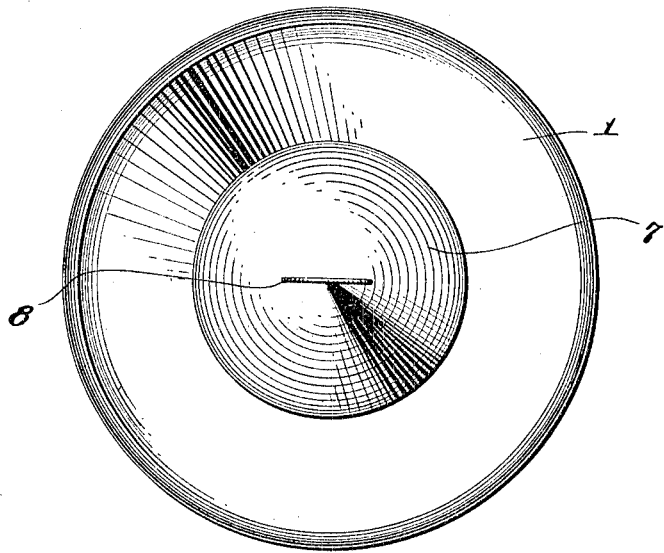
Figure 3:
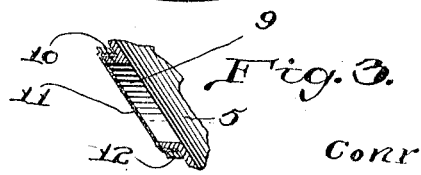

In the accompanying drawing: Figure 1 is a central vertical section taken through the strainer and strainer body. Fig. 2 is a top plan of the device. Fig. 3 is a sectional view of a portion of the strainer body.

Referring to the accompanying drawing by numerals it will be seen that the device is provided with a funnel 1 having a reduced neck 2 for allowing the same to be positioned upon the support. Adjacent the upper portion of this neck 2 there is provided a supporting platform 3 having an upwardly extending flange 4 thereby forming an aperture through which the strainer member may be placed. The strainer member comprises a flared body 5 terminating in an inwardly bent supporting flange 6 upon which the conical hood 7 is positioned, this hood 7 being provided with a lifting handle 8. The side portions of this flared body is provided with a plurality of apertures 9 having the laterally bent lips 10. The apertures 9 are covered by means of the filters 11 which may be formed of wire, cloth or other suitable material. In order to hold these filters 11 in position, a retaining band 12 is positioned upon the outer portion of the filter, so as to rest upon the outer face of the flange 10 and in this manner bind the filter in engagement therewith.

The flared body 5 is provided at its lower portion with a threaded portion 13 which is adapted to receive the threaded collar 14, and this threaded collar 14 carries the conical strainer 15. When this device is used, the liquid which is being strained is poured into the strainer and will, of course, strike upon the hood 7. The liquid will then pass around the edges of the hood and will strike upon the platform 3 whereby the large dirt will be deposited thereon. When the liquid has reached a sufficient height it will pass through the filter member 11, through the apertures 9 and downwardly through the conical filter 15 into the receptacle which is being filled. Since the strainer body 5 is flared toward its upper portion, the flange 4 will firmly engage the sides thereof, so as to prevent any dirt passing into the receptacle which is being filled, but when it is desired to remove the strainer member it may be lifted from the flange 4 by means of the lifting handle 8. Since the collar 14 is threaded into engagement with the flared body it may easily be removed for substituting a new filter 15 when so desired and by removing the clamping bands 10, new filters 11 may be placed over the apertures 9.

Having thus described the invention, what is claimed as new, is:

A device of the class described comprising a body, said body provided with a supporting platform having a vertically bent flange, said strainer body being flared toward its upper portion, a hood carried by said strainer body, said strainer body provided with a plurality of apertures, laterally bent lips formed adjacent said apertures, filters positioned upon said lips to cover said apertures, clamping bands positioned upon said filters and said lips for holding said filters in engagement with said lips, a conical filter detachably secured to the lower portion of said strainer body, said strainer body detachably supported on said flange whereby said strainer body may be easily removed for substituting new parts, when so desired.

In testimony whereof I hereunto affix my signature in presence of two witnesses.

CONRAD EKVALL.

Witnesses:
R. WAITE JOSLYN,
FRANK W. JOSLYN.

Copies of this patent may be obtained for five cents each, by addressing the "Commissioner of Patents, Washington, D. C."